United States Patent [19]
Wood

[11] Patent Number: 5,917,968
[45] Date of Patent: Jun. 29, 1999

[54] APPARATUS AND METHOD FOR USING A HINGE TO COMMUNICATE SIGNALS BETWEEN A FIRST CIRCUIT IN A FIRST HOUSING AND A SECOND CIRCUIT IN A SECOND HOUSING

[75] Inventor: Anthony B. Wood, Dallas, Tex.

[73] Assignee: Texas Instruments Incorporated, Dallas, Tex.

[21] Appl. No.: 08/773,422

[22] Filed: Dec. 27, 1996

[51] Int. Cl.⁶ ................................ G02B 6/00; G02B 6/26
[52] U.S. Cl. .......................... 385/15; 385/147; 361/680
[58] Field of Search .................... 361/680, 681, 361/682, 683; 385/15, 147

[56] References Cited

U.S. PATENT DOCUMENTS

| | | | |
|---|---|---|---|
| 4,865,553 | 9/1989 | Tanigawa et al. .................... | 439/31 |
| 5,168,423 | 12/1992 | Ohgami et al. ..................... | 361/394 |
| 5,677,827 | 10/1997 | Yoshioka et al. .................... | 361/683 |

*Primary Examiner*—Akm E. Ullah
*Attorney, Agent, or Firm*—Ronald O. Neerings; William B. Kempler; Richard L. Donaldson

[57] ABSTRACT

A notebook computer (30) passes signals between a main housing (36) and a display housing (38) through a hinge (32). The hinge has a plurality of conductive members (34) which can be electrically conductive members (40) or optically conductive members (40) or a combination of both. An optical fiber (76) can be used alone or in conjunction with the hinge members (34) to transmit signals without generating EMI.

20 Claims, 4 Drawing Sheets

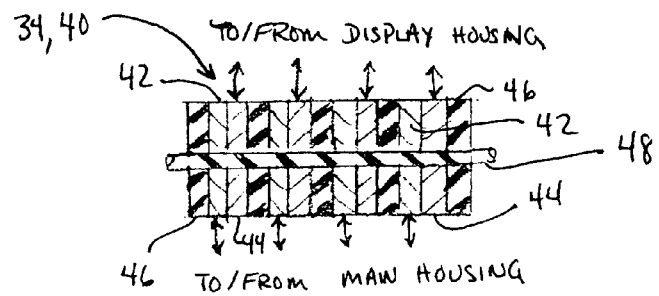
FIG. 3
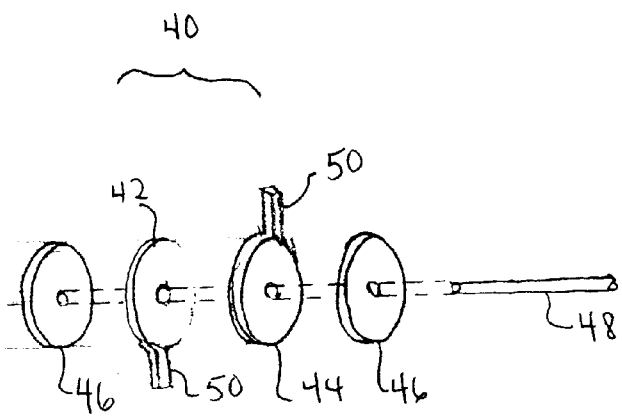
FIG. 4
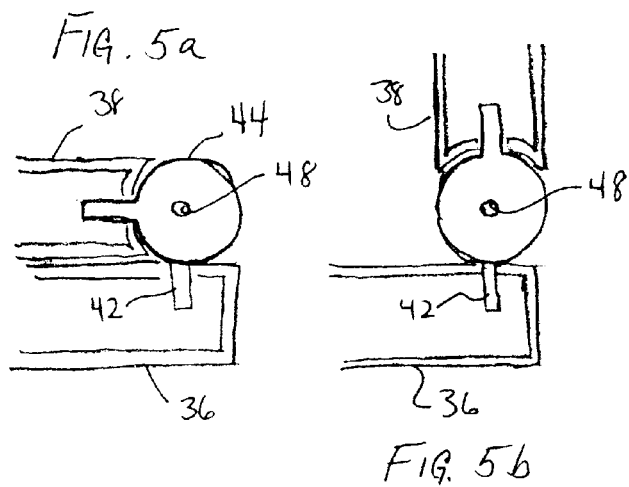
FIG. 5a
FIG. 5b

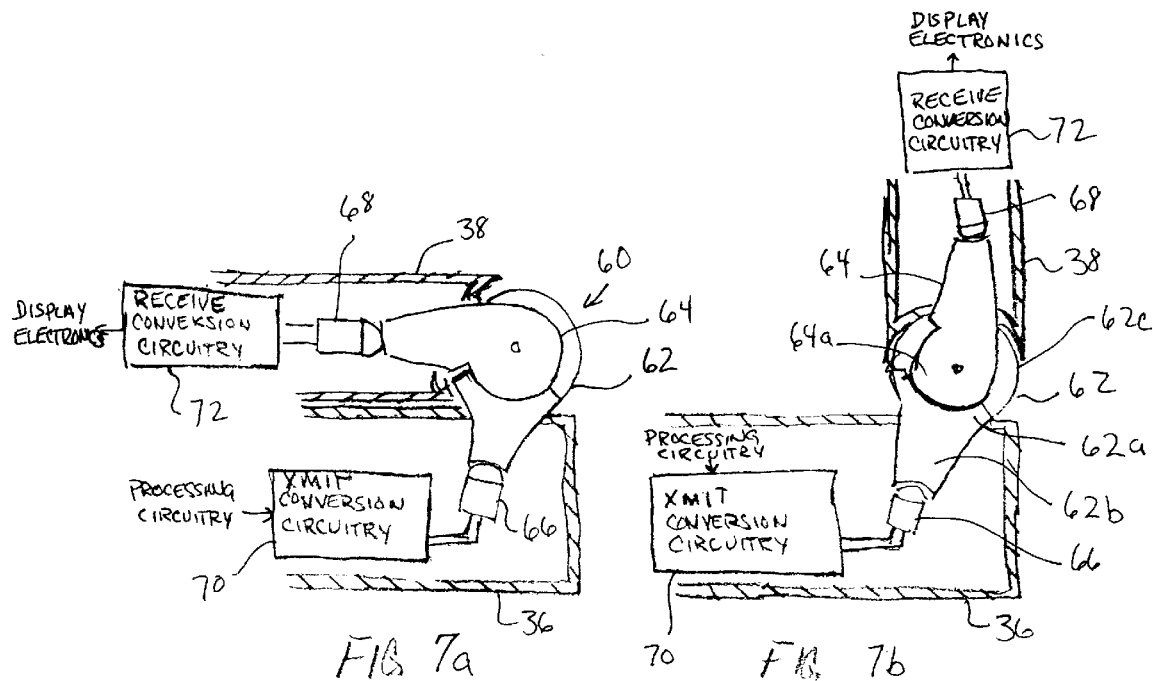
FIG 7a
FIG 7b
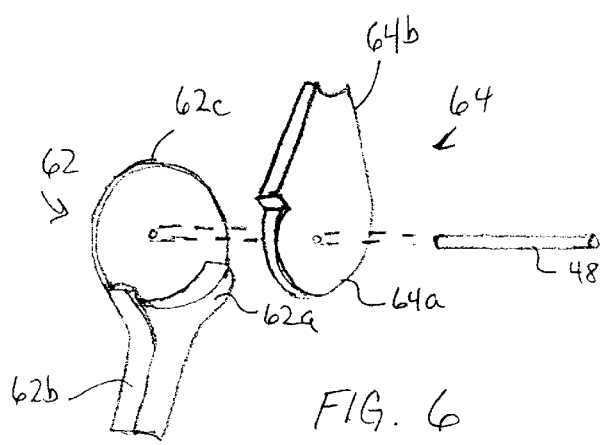
FIG. 6

APPARATUS AND METHOD FOR USING A HINGE TO COMMUNICATE SIGNALS BETWEEN A FIRST CIRCUIT IN A FIRST HOUSING AND A SECOND CIRCUIT IN A SECOND HOUSING

BACKGROUND OF THE INVENTION

1. Technical Field

This invention relates in general to computers and, more particularly, to a method and apparatus for supplying power to the display in a portable computer.

2. Description of the Related Art

Since the proliferation of the personal computer as a personal and business tool, portable computers have been in high demand. Portable computer manufacturers are continually refining the portable computers to have a greater number of features while reducing the size and weight of the units.

Very low weight portable computers are referred to as "notebook" computers. At one time, notebook computers were stripped of many features in order to reduce weight and size; however, current day notebook computers are full-featured.

In notebook displays, the trend is clearly towards providing larger, higher resolution screens which are comparable to CRT (cathode ray tube) screens used with desktop computers. As the resolution and color depth supported by the display increases, the amount of information which must be sent from the main housing to the display housing similarly increases. In many cases, the additional bandwidth is accommodated by increasing the number of signal lines between the main housing and the display housing.

Simply increasing the number of signal lines has its drawbacks. First, with the addition of each line, the amount of EMI (electro-magnetic interference) increases. EMI is strictly regulated by the FCC (Federal Communication Commission). Second, the signal and power lines passing between the main housing and the display housing are typically threaded through one of both of the hinges (or other rotation mechanism) connecting the two housings by manual assembly. As the number of video signal lines increases, the additional volume makes threading the signals lines through a hinge more difficult.

Therefore, a need has arisen in the industry to provide an efficient, low interference method and apparatus for passing signals between two connected housings.

SUMMARY OF THE INVENTION

The present invention provides a efficient manner of routing signal lines between a first housing containing a first circuit and a second housing containing a second circuit. A hinge connected to said first and second housings includes one or more first hinge pieces coupled to said first circuit and one or more second hinge pieces coupled to respective ones of said first hinge pieces and to said second circuit, respective pairs of said first and second hinge pieces being operable to communicate a signal between one another.

The present invention provides significant advantages over the prior art. Because the hinge itself is able to carry the signals between the first and second housings, the cable between the first and second housings can be eliminated or, at least, reduced in size. By using a photoemitting device to transmit signals through the first hinge members and photosensitive receivers (such as a PIN diode) to receive the light signal through the first hinge members, EMI can be greatly reduced.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a cross-sectional view of a portion of a hinge using in FIG. 2 for conducting electrical signals;

FIG. 4 illustrates an exploded view of a hinge member shown in FIG. 3;

FIGS. 5a and 5b illustrates the hinge member of FIGS. 3 and 4 used in a notebook computer in open and closed configurations;

FIG. 6 illustrates an exploded view of a hinge member used to communicate optical signals;

FIGS. 7a and 7b illustrate the hinge member of FIG. 6 used in a notebook computer in open and closed configurations.

DETAILED DESCRIPTION OF THE PREFERRED EMBODIMENT

The present invention is best understood in relation to FIGS. 1–8 of the drawings, like numerals being used for like elements of the various drawings.

Figure 1:
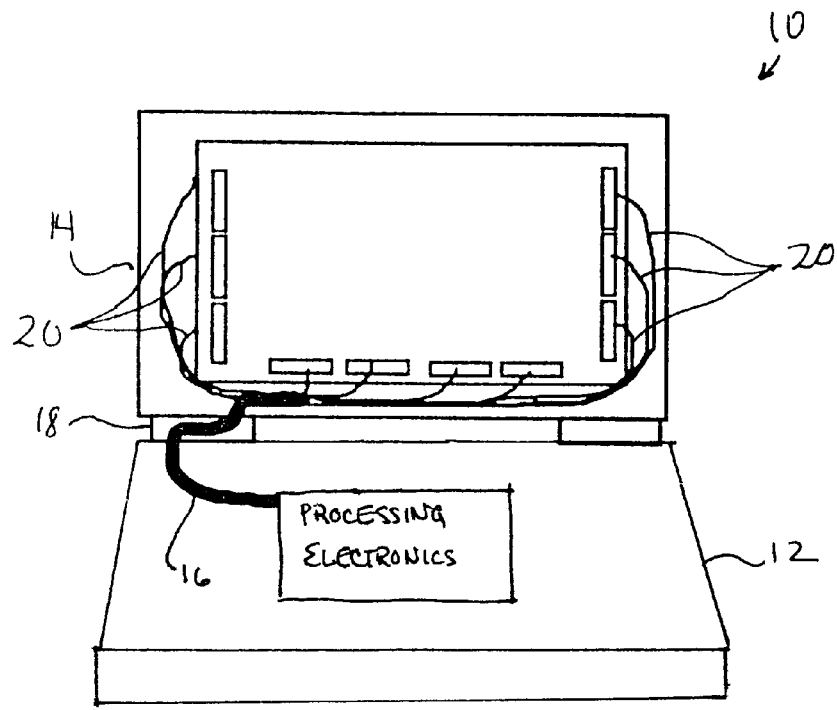
FIG. 1 illustrates a prior art structure for communicating signals between a main housing and a display housing in a notebook computer.

FIG. 1 illustrates a prior art structure for providing video signals and power in a notebook computer 10. The notebook computer 10 includes a main housing 12 and a display housing 14. The main housing 12 typically includes the processing electronics such as the central processing unit, video controller, sound circuitry, main memory, mass storage memory and input/output circuitry. The display housing typically includes a flat panel display, such as a LCD (liquid crystal display) panel or an FED (field effect display) and associated electronics.

A cable 16 is disposed through one or more hinges 18 which connect the main housing and the display housing. The cable includes signal lines 20 for all signals which must be passed between the two housings. Typically, these signals will include the video information signals and the power signals, including one or more voltage signals and a ground signal.

As previously discussed, as the number of signal lines between the two housings increases, the ability to use this structure while limiting EMI noise becomes more and more difficult.

Figure 2:
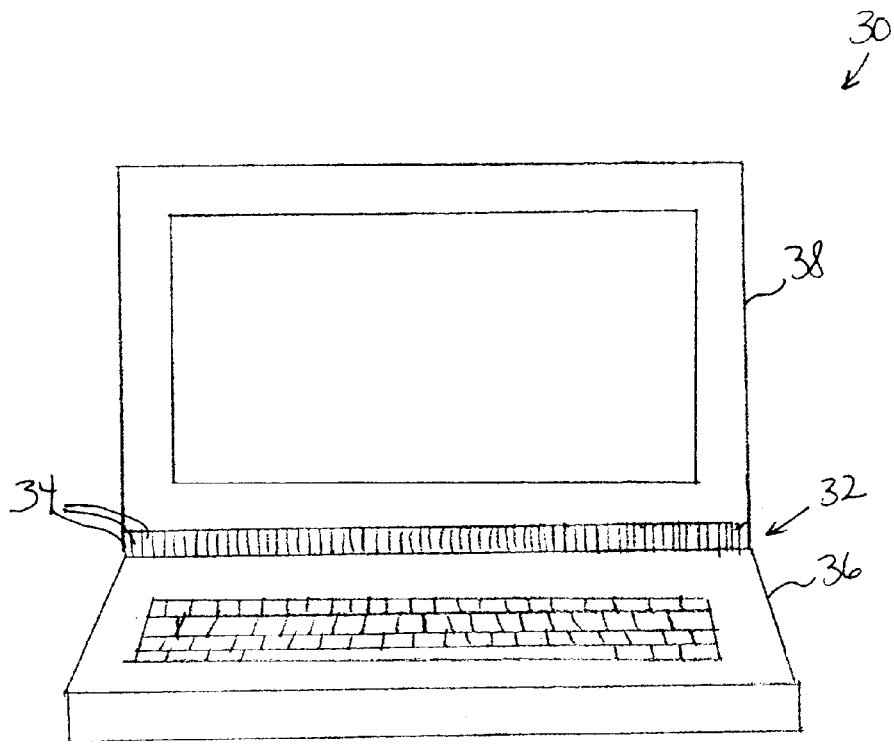
FIG. 2 illustrates a preferred embodiment of a structure for communicating signals through a hinge coupling separate housings of a notebook computer.

FIG. 2 illustrates a notebook computer 30 using a hinge 32 which passes signals through hinge members 34. As in FIG. 1, the notebook computer 30 includes a main housing 36 and a display housing 38. The main housing 36 typically includes the processing electronics such as the central processing unit, video controller, sound circuitry, main memory, mass storage memory and input/output circuitry. The display housing 38 typically includes a flat panel display, such as a LCD (liquid crystal display) panel or an FED (field effect display) and associated electronics.

Signals to be passed between the main housing 36 and the display housing 38 are passed through hinge members 34, either electrically or through light transmission, as described in greater detail hereinbelow. In the preferred embodiment, signals which are a source of EMI noise, particularly the high bandwidth, high frequency video signals, are passed through the hinge members 34 using light transmission, while the power signals are passes through hinge members 34 by electrical conduction.

While FIG. 2 illustrates a single hinge which spans the width of the interface between the main housing 36 and the display housing 38, alternative embodiments could use two or more hinges. The number of hinge members 34 depends upon the number of signals passing between the main housing 36 and the display housing 38. If the number of hinge members 34 needed to pass signals is less than the number of hinge members needed for support of the display, non-conductive hinge members could be used.

FIG. 3 illustrates a cross sectional view of hinge members 40 used for electrically conducting signals between the main housing and the display housing. Conductive hinge members 40 can be used as one or more or the hinge members 34 shown in FIG. 2. Conductive hinge members 40 comprise a first plate 42 and a second plate 44 which are in electrical contact. First plate 42 is coupled to electronics in the main housing 36 and second plate 44 is coupled to electronics in the display housing 38. Isolation plates 46 are disposed between sets of first and second plates 42 and 44 to prevent electrical contact between adjacent conductive hinge members 40. A shaft 48 is disposed through plates 42, 44, and 46 to form the rotating hinge.

In operation, each set of plates 42 and 44 forms an electrical connection between the display housing 38 and the main housing 36, without the need for wires to pass between the two housings. Plates 42 and 44 can be formed of any rigid conductive material or formed from a non-conductive material with a conductive coating. As the display housing 38 moves relative to the main housing 36, the plates 42 and 44 rotate relative to one another while maintaining electrical contact. Plates 40 are particularly suited to power signals, where EMI is not a concern. Other low frequency signals, such as audio signals, could also be passed through conductive members 40.

FIG. 4 illustrates an exploded view of a conductive hinge member 40. The first plate 42 and second plate 44 have extended portions 50 for contacting circuitry in their respective housings. The plates 42 and 44 are flanked by isolation plates 46. Alternatively, plates 42 and 44 could have non-conductive coatings on their outside surfaces.

FIGS. 5a and 5b illustrate movement of a conductive hinge member 40 as the notebook computer 30 is opened and closed. In FIG. 5a, the display housing 38 is flush against the main housing 36. As the display housing 38 is rotated away from the main housing 36, the second plate 44 rotates along with the display housing 38, while maintaining electrical contact with the first plate 42.

FIG. 6 illustrates a perspective view of a hinge member 60 which can be used as one of the hinge members 34 to transmit signals between the main housing 36 and the display housing 38 through light transmission. Hinge member 60 includes a first piece 62 and an second piece 64. Second piece 64 has a generally round portion 64a and an extended portion 64b. First piece 62 has a support portion 62a which mates with round portion 64a, an extended portion 62b, and a side portion 62c. Shaft 48 is disposed through side portion 62c and round portion 64a.

Round portion 64a and support portion 62a are shaped such that the two portions maintain contact as the main housing 36 and display housing 38 are folded, such that communication between the housings can occur at multiple angles. Extended portions 62a and 64a extend into the respective main and display housings 36 and 38.

Side portion 62c, in conjunction with shaft 48 hold hinge pieces 62 and 64 together as they rotate relative to one another. Each hinge member 60 should be optically isolated from an adjacent hinge member 60. A suitable coating or non-transmissive material may be positioned between hinge pairs.

FIGS. 7a and 7b illustrate a hinge member 60 in notebook computer 30. Extended portion 62b is disposed in the main housing 36 and extended portion 64b is disposed in display housing 38. For a signal which is generated in the main housing 36 and sent to the display housing 38, a light transmitter 66, such as an LED (light emitting diode), is optically coupled to extended portion 62a. A light detector 68, such as a PIN diode, is coupled to extended portion 64b. Transmit conversion circuitry 70 is coupled to light transmitter 66 and receive conversion circuitry 72 is coupled to light detector 68.

First and second pieces 62 and 64 are constructed from a translucent material, such as an acrylic material. Transmitter 66 and detector 68 may be mounted flush with the extended portions 62b and 64b, respectively, or may alternatively be embedded within the first and second pieces 62 and 64.

In operation, data to be sent from the main housing 36 to the display housing 38 is translated into light signals via transmitter 66. Responsive to signals from transmit conversion circuitry 70, the transmitter outputs a stream of light pulses. Each light pulses illuminates first piece 62, which is optically coupled to second piece 64. Hence, the light from transmitter 66 also illuminates second piece 64. The light pulses are detected by detector 68, which converts the light to an electrical signal. Electrical signals from detector 68 are converted by receive conversion circuitry 72.

Transmit conversion circuitry may take advantage of the ability of the hinge members 60 to communication at high frequencies, without adding EMI noise. Since the hinge members 60 can communicate data at higher speeds that conventional CMOS/TTL signal lines, the transmit conversion circuitry can convert the output of a set of CMOS/TTL signal lines to be broadcast onto a smaller number of hinge members 60, at a high frequency to maintain the bandwidth of the signal. If the video data has already been converted into a high frequency LVDS (low voltage differential signal) format, the transmit conversion circuitry may need to modify the differential voltage signals in order to drive the transmitters 66. The receive conversion circuitry 72 converts the signals from the light detector into words of a desired length. Receive conversion circuitry 72 may also adjust the logic levels of the output of the light detector to desired levels for driving the display or other circuitry in the display housing 38.

In the example of FIGS. 7a and 7b, it is assumed that communication via the hinge members 60 is directed from main housing 36 to display housing 38. Communication from display housing 38 to main housing 36 can be provided by providing a transmitter 66 adjacent the second piece 64 and a detector 68 adjacent the corresponding first piece 62.

Figure 8:
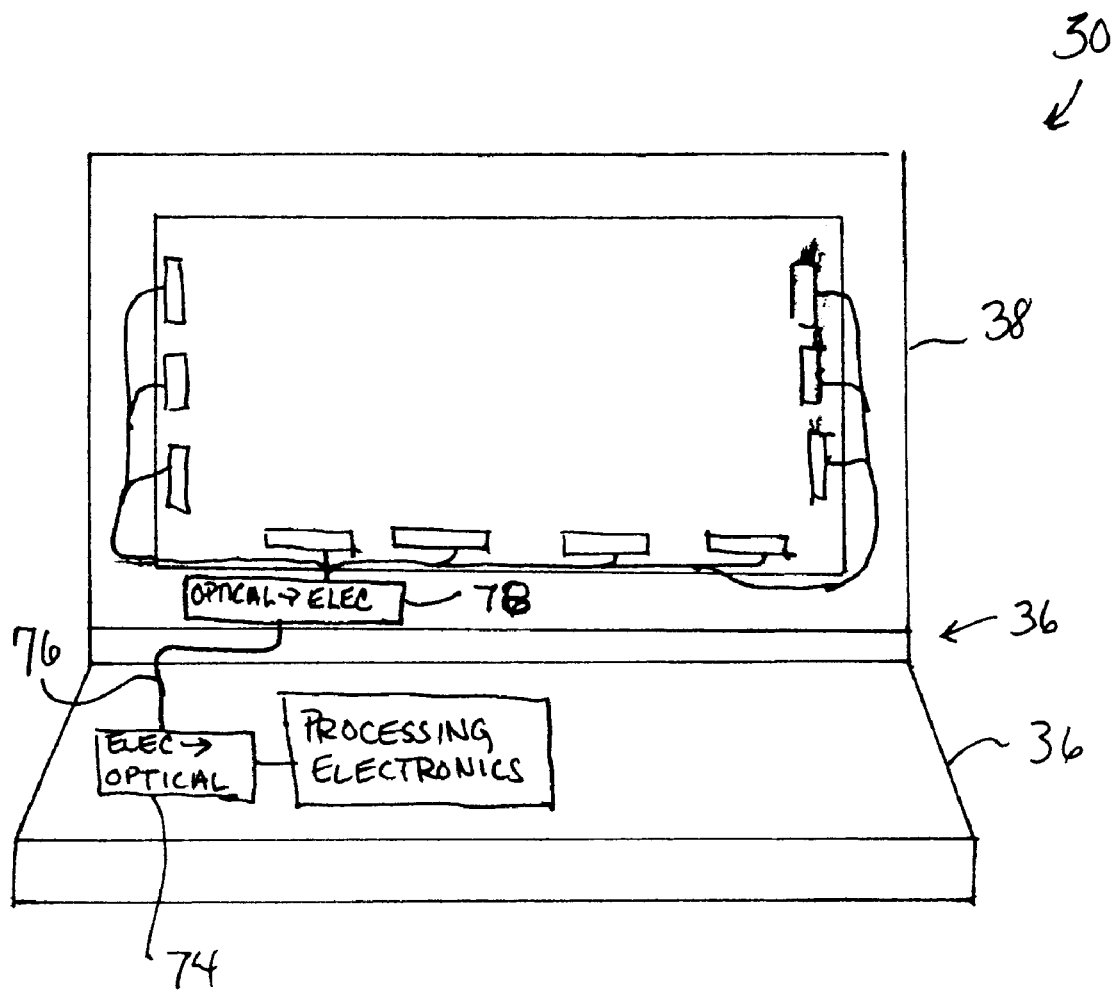
FIG. 8 illustrates an alternative embodiment for transmitting information between separate housings using optical transmission of signals.

FIG. 8 illustrates another structure for high speed communication between the main housing 36 and the display housing 38, which can be used either alone or in conjunction with the hinge members 40 and 60 discussed above. In this embodiment, the data which is to be sent from the processing electronics of the main housing 36 is converted to optical (i.e., light signals) by optical-to-electrical circuitry 74. The optical signals are communicated to the display housing through one or more optical fibers 76. The output of the optical fiber is translated back to an electrical signal by optical-to-electrical circuitry 78. The output of the optical-to-electrical circuitry 78 is sent to circuitry in the display housing 38, such as the display panel.

In the preferred embodiment, to prevent damage to the optical fiber, or bundle or optical fibers, the fiber or fiber are aligned through the with a gradual torsion, rather than being bent, to prevent damage to the fibers as the notebook is opened and closed.

If data is also passed from the display housing 38 to the main housing 36, electrical-to-optical circuitry could also be placed in the display housing 38 and optical-to-electrical circuitry could be placed in the main housing 36.

While the present invention has been discussed in relation to a main housing and a display housing in a notebook computer, it could be used in any electronic device where high bandwidth communication is performed between two housings.

The present invention provides significant advantages over the prior art. Because the hinge itself is able to carry the signals between the first and second housings, the cable between the first and second housings can be eliminated or, at least, reduced in size. By using a photoelectric cell to transmit signals through the first hinge members and photosensitive receivers to receive the light signal through the first hinge members, EMI can be greatly reduced.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. An electronic device comprising:
   a first housing for containing a first circuit;
   a second housing for containing a second circuit; and
   a hinge coupling said first and second housings, comprising:
      first hinge pieces coupled to said first circuit; and
      second hinge pieces rotatably coupled to respective ones of said first hinge pieces and coupled to said second circuit, respective pairs of said first and second hinge pieces operable to transmit a signal from said first circuit to said second circuit.

2. The electronic device of claim 1 wherein said first and second hinge pieces conduct light signals.

3. The electronic device of claim 2 wherein said hinge further comprises photoelectric devices associated with each of said first hinge pieces and disposed in said first housing for generating a light signal responsive to an electrical signal from said first circuit.

4. The electronic device of claim 3 wherein said hinge further comprises photosensitive devices associated with each said second hinge pieces and disposed in said second housing for generating an electrical signal responsive to receiving a light signal through said first and second hinge pieces.

5. The electronic device of claim 4 wherein said hinge further comprising third and fourth hinge pieces for transmitting an electrical signal, said third and fourth hinge pieces rotatably coupled together.

6. The electronic device of claim 2 wherein said first and second hinge pieces are formed of an acrylic material.

7. The electronic device of claim 1 wherein said first and second hinge pieces conduct electrical signals.

8. The electronic device of claim 7 wherein said first and second hinge members conduct power signals.

9. A method of transmitting signals between a first circuit in a first housing and a second circuit in a second housing comprising the steps of:
   applying signals from said first circuitry to one or more first hinge pieces of a hinge coupling said first housing to said second housing; and
   receiving signals applied to said first hinge pieces at respective second hinge pieces rotatably mounted to said first hinge pieces and coupled to said second circuitry.

10. The method of claim 9 wherein said applying step comprises the steps of:
    translating signals from said first circuit to light signals; and
    emitting said light signals to said first hinge pieces.

11. The method of claim 10 wherein said receiving step comprises the step of translating light signals into electrical signals.

12. The method of claim 9 wherein said applying step comprises the step of applying electrical signals to said first hinge pieces.

13. An electronic device comprising:
    a first housing for containing a first circuit;
    a second housing for containing a second circuit; and
    a hinge coupling said first and second housings, comprising:
       first hinge pieces coupled to said first circuit; and
       second hinge pieces rotatably coupled to respective ones of said first hinge pieces and coupled to said second circuit, said first and second hinge pieces operable to transmit signals from said first circuit to said second circuit.

14. The electronic device of claim 13 wherein said first hinge pieces are electrically coupled to said first circuit and said second hinge pieces are electrically coupled to said second circuit.

15. The electronic device of claim 13 wherein said first and second hinge pieces conduct light signals.

16. The electronic device of claim 15 wherein said hinge further comprises photoelectric devices associated with each of said first hinge pieces and disposed in said first housing for generating a light signal responsive to an electrical signal from said first circuit.

17. The electronic device of claim 16 wherein said hinge further comprises photosensitive devices associated with each said second hinge pieces and disposed in said second housing for generating an electrical signal responsive to receiving a light signal through said first and second hinge pieces.

18. The electronic device of claim 17 wherein sand hinge further comprising third and fourth hinge pieces for transmitting and electrical signal, said third and fourth hinge pieces rotatably coupled together.

19. The electronic device of claim 14 wherein said first and second hinge pieces are formed of an acrylic material.

20. The electronic device of claim 13 wherein said first and second hinge pieces conduct electrical signals.

* * * * *